Figure 4:
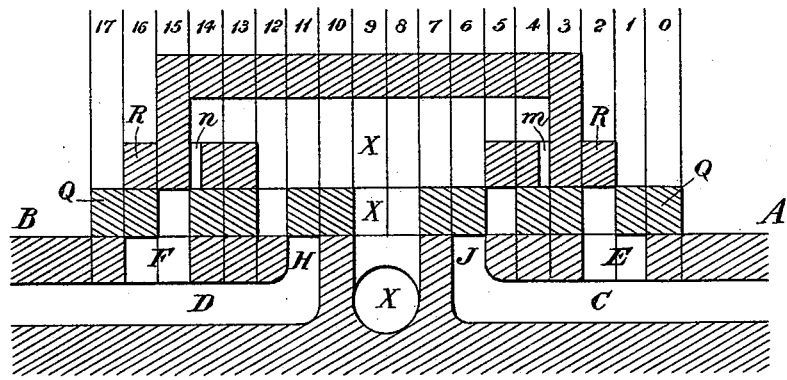

(No Model.) 4 Sheets—Sheet 1.
C. W. THOMPSON.
VALVE FOR STEAM ENGINES.
No. 544,199. Patented Aug. 6, 1895.
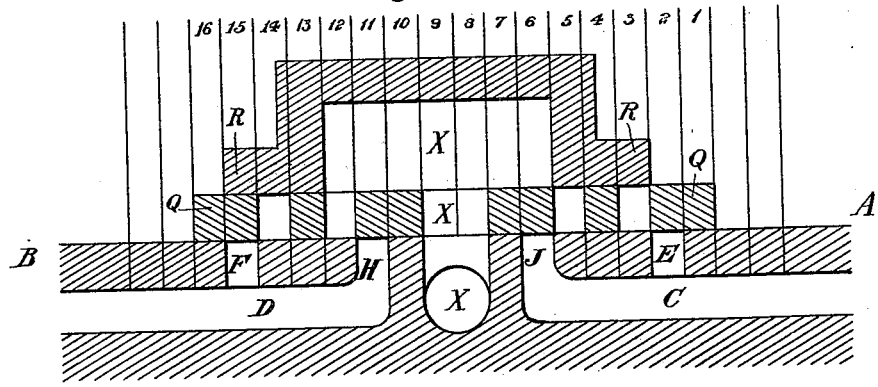
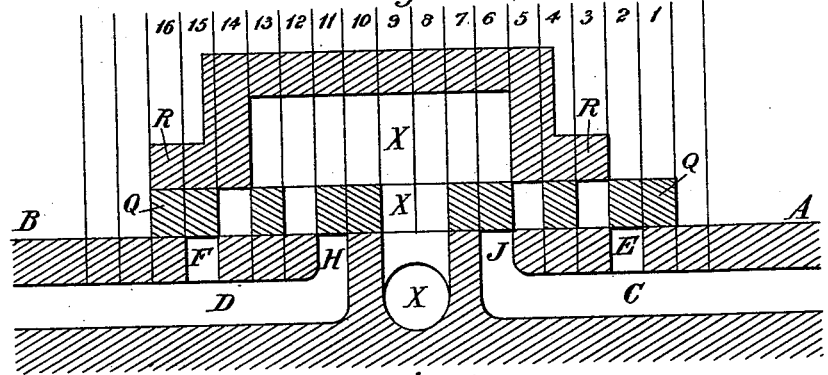
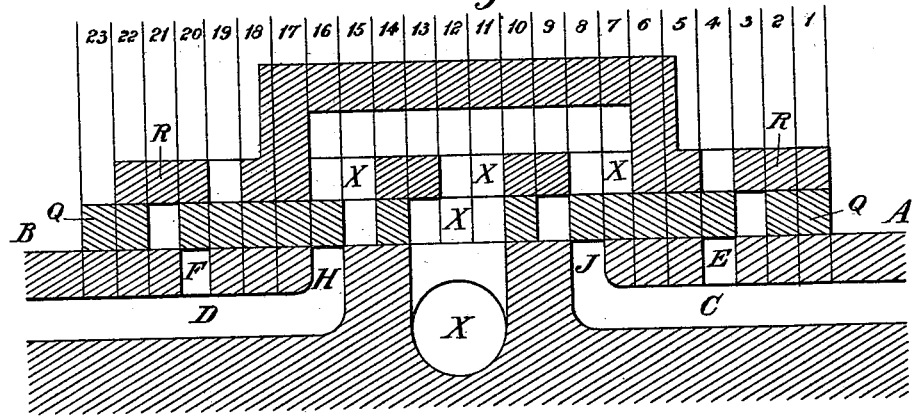

(No Model.) 4 Sheets—Sheet 2.
C. W. THOMPSON.
VALVE FOR STEAM ENGINES.

No. 544,199. Patented Aug. 6, 1895.

Witnesses
George Baumann
J. C. Connor

Inventor
Courtenay W. Thompson
By his Attorneys
Howson & Howson (No Model.) 4 Sheets—Sheet 3.
C. W. THOMPSON.
VALVE FOR STEAM ENGINES.
No. 544,199. Patented Aug. 6, 1895.
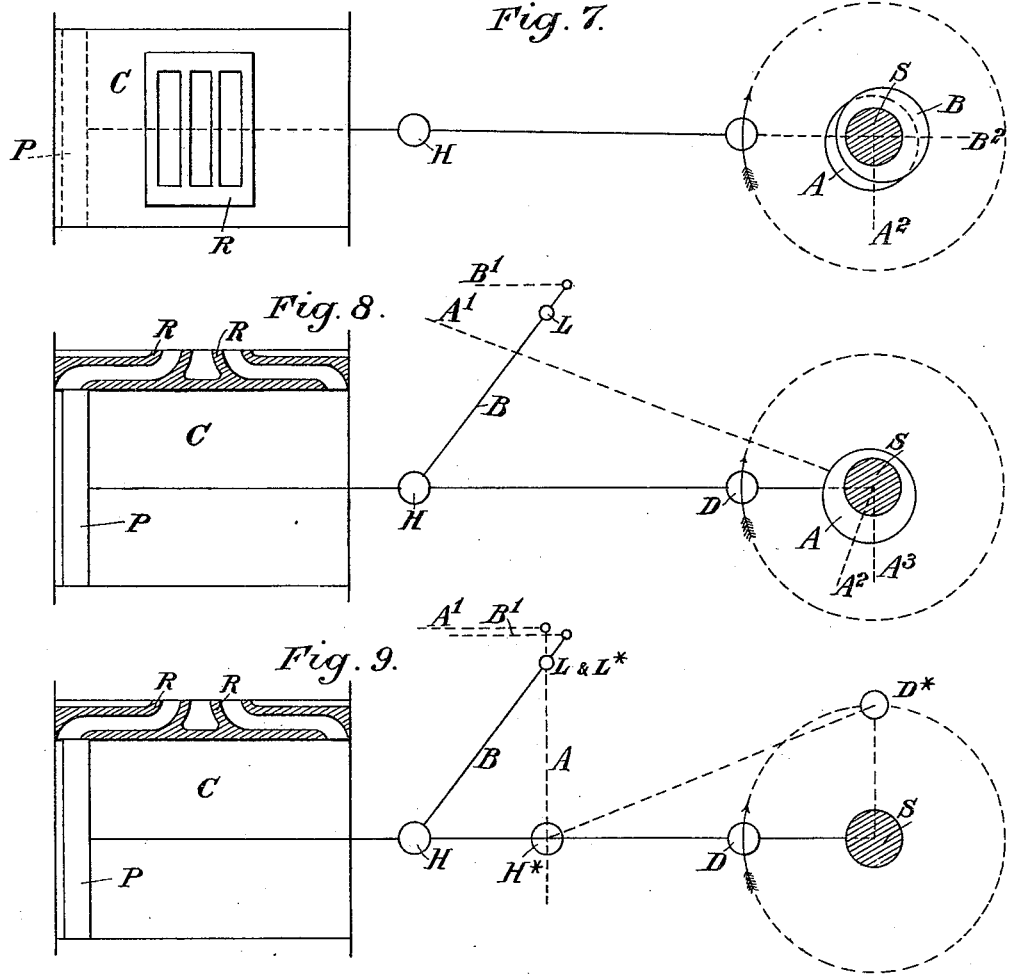
Witnesses
George Baumann
J. C. Crum
Inventor
Courtenay W. Thompson
By his Attorneys
Howson & Howson

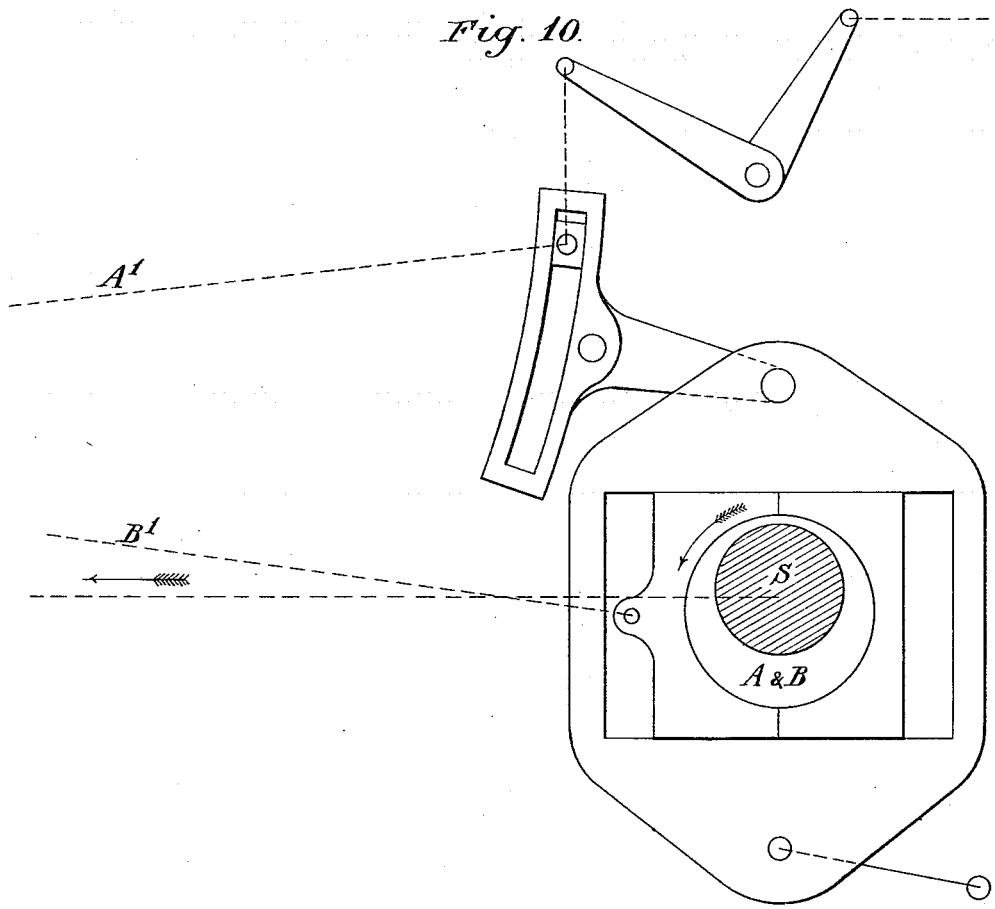

UNITED STATES PATENT OFFICE.

COURTENAY W. THOMPSON, OF LONDON, ENGLAND.

VALVE FOR STEAM-ENGINES.

SPECIFICATION forming part of Letters Patent No. 544,199, dated August 6, 1895.

Application filed December 18, 1894. Serial No. 532,181. (No model.)

*To all whom it may concern:*

Be it known that I, COURTENAY WILLIAM THOMPSON, mining engineer, a subject of the Queen of Great Britain and Ireland, residing at 5 Fair Street, Tooley Street, London, in the county of Surrey, England, have invented certain Improvements in and Connected with Valves for Steam-Engines or Like Engines Operated by Expansible Fluid or Vapor, of which the following is a specification.

My invention relates to slide-valves of steam-engines or like engines operated by expansible fluid or vapor, which valves may be flat, piston, or oscillating or other valves, and my said invention has for its object to obtain the greatest possible openings of the inlet and exhaust ports to and from the engine cylinder or cylinders for any given travel of the valve-rods and eccentrics, and, coincident with this advantage, to permit of and facilitate a very large range in the regulation of the cut-off for expansion, the moment for inlet of motive fluid and for opening the exhaust, the closing of the exhaust ports for cushioning, the governing of the speed, and the reversal of the engine to suit varying conditions of power, speed, and other requirements.

Figures 1, 2, 3, 4, 5, and 6 are longitudinal sectional views of the slide-valves and part of the cylinder-casing, showing different modifications of my invention. Figs. 7, 8, 9, and 10 are diagrammatic detail views of several different forms of valve-operating mechanism used with my invention.

I use a valve-slide plate, sliding on the fixed valve-seating in the valve-chest, which valve-slide plate is hereinafter called the "main" slide, and another slide-plate, sliding on the back of the main slide, which is hereinafter called the "cut-off" slide. It will be evident, however, from the following description, that the valves which have the particular relative functions, as hereinafter described, are not necessarily arranged with the cut-off slide on the back of the main slide, as their positions may be reversed, while still operating relatively to each other. According to my invention, two principal features are that I use the cut-off slide not only to cut off the inflow of motive fluid to the cylinder, (for expansion,) but I also use it to operate the exhaust-ports, so as to regulate the cushioning of the main piston and the opening of the cylinder to exhaust and to operate the inlet-ports, so as to regulate the moment at which inlet of motive fluid to the cylinder is effected, and that I set the eccentric operating the main slide, which eccentric is hereinafter called the "main" eccentric, at right angles to the main engine-crank, and the eccentric operating the cut-off slide, which eccentric is hereinafter called the "cut-off" eccentric, in a line with the same crank, and I arrange the two slide-plates relatively to each other, so that when the main slide has half completed its travel, say from right to left, the cut-off slide is just about to commence its travel in the same direction, or from right to left, and so on with reciprocating action, the main slide being always in advance of the cut-off slide. In some cases, especially where no reversal of the engines is required, I may slightly modify the relative angular position in the direction of rotation of the eccentrics to one another and to the main engine-crank: but the greatest advantage is obtained by placing the eccentrics as nearly as possible as described.

By using the cut-off slide, as described, there is no necessity to give lead to the main eccentric, (though the cut-off slide may have the functions additional to those of cutting off steam for expansion which are herein described, even when the eccentrics have lead or when the valves operate in any ordinary way, as in ordinary gears,) and consequently nearly the full length of travel of the main slide is effective in creating large port-openings, and the fact that by so using the cut-off slide there is no necessity to give lead to the main eccentric permits of a great variety in the choice of gear from among eccentrics and other similarly acting and controlled mechanisms for operating the valve-slides, so that they perform the functions and have the relative movements, as herein described. In order to produce this effect the inlet and exhaust ports are so arranged that they are uncovered as soon as, or before, the main slide has reached its central position of travel. Cut-off may then be effected by the cut-off slide, and also the exhaust-ports may be arranged to be closed at the desired moment by the same cut-off slide, so as to regulate the degree of cushioning. I also prefer to arrange the cut-off slide to regulate the moment of inlet of motive fluid and of opening the cylinder to exhaust, and these operations for opening and closing ports for inlet and exhaust to the cylinder are effected by the movements of these two valve-slides relatively to each other, with or without reference to the movement of the main slide relatively to the openings in the valve-face, as hereinafter described particularly with reference to Figs. 4, 5, and 6 of the accompanying drawings. The amount of cushioning of the piston and the moment of inlet of motive fluid and of opening to exhaust can, therefore, be regulated at will according to the degree of cut-off and engine-speed, and to suit other conditions, as required.

I will now illustrate a few examples of the uses and working of my invention by reference to the accompanying drawings, as follows:

Figs. 1, 2, 3, 4, 5, and 6 represent longitudinal sections through the slide-valves and cylinder-casings.

A B shows part of the cylinder, and the valve-seat is on the surface, at A B.

Q is the main slide and R is the cut-off slide.

The length and travel of the valves and the length and position of the ports are indicated by the equal divisions numbered 1, 2, 3, and so on.

The motive fluid is presumed to occupy the space within the valve-chest at the back of the valves. The exhaust-passages are at X X.

C and D are the ports communicating with the respective ends of the cylinder, and E and F are the inlet-ports, and J and H are the exhaust-ports in the valve-seating.

In Fig. 1 the main piston is presumed to be at the A end of the cylinder, the main slide Q is in the central position of its travel in the direction from B to A—that is, the main eccentric is at right angles to the cut-off eccentric, as is shown by the cut-off slide being at the B end of its travel—and the total travel of the main slide is equal to two of the divisions. The cut-off slide R is at the B end limit of its travel—that is, the cut-off eccentric is diametrically opposite to, but in the same line as, the main crank—and its total travel is only equal to one of the divisions. Fig. 3 illustrates the general arrangement when the cut-off eccentric is coincident with the main crank.

During the A to B stroke of the piston the main slide Q travels forward and back over one division, and starts in the direction from B to A, and the cut-off slide R travels forward through one division. (From B toward A.) It will now be seen how the motive-fluid port 3 Q in the main slide Q opens and shuts the inlet-port E to the A end of the cylinder, and how the exhaust-port 12 Q opens and shuts the exhaust-port H to the B end of the cylinder. During the B to A stroke of the piston the reverse of these actions takes place.

By varying the length of travel of the main slide Q, the moment at which the cut-off slide R will cut off steam may be varied from nothing to about seven-eighths of the stroke.

The cut-off of motive fluid can also be varied by altering the travel of the cut-off slide R; but it must only be altered slightly, (unless a different slide be introduced,) because of its connection with the exhaust. The more the travel of the cut-off slide R is increased the sooner will it close the exhaust-ports and cause increased cushioning in the cylinder.

If the ports E and F be widened, say, one-quarter of a division into the divisions 3 and 14, respectively, then the moment of inlet of motive fluid can be controlled by slightly altering the travel of the cut-off slide R, and the more the travel of the cut-off slide R is increased the sooner it will open the cylinder to motive fluid.

By altering the size and position of the ports and by adding on or taking off inside or outside "lap" the conditions of the distribution of motive fluid can be altered. For instance, if the exhaust-port J be widened toward the division 5 then the A end of the cylinder will be opened to exhaust earlier, and this can be done without interfering with the closing of the said exhaust-port J, because closing may be effected and regulated by the cut-off slide R. (Also see Figs. 4, 5, and 6 for other examples of this provision for modifying the ports.)

In Fig. 2 the valve-seat A B and the main slide Q are the same as in Fig. 1; but a different cut-off slide R is shown, it being one division longer inside the exhaust-chamber at X, and with this alteration the length of its travel can be doubled—namely, to that of two divisions. This enables the main slide Q to effect a large movement and opening for about a half cut-off or less, according to its travel. All the other conditions are similar to those described in Fig. 1.

Fig. 3 shows how the ports and other parts may be arranged when the cut-off eccentric is placed coincidently with the main crank, and consequently when the cut-off slide R travels in the same direction as the main piston. In this arrangement, as in the arrangement Fig. 1, the cut-off slide has about half the full travel of the main slide.

The operation will be readily understood by reference to Fig. 3 and the other conditions are the same as those which apply to Figs. 1 and 2.

The arrangement shown in Fig. 4 operates as does that shown in Fig. 1 and has all the same properties, except that there is a modification of the ports introducing additional openings to the exhaust. m and n are these additional exhaust-openings in the cut-off slide R, operated by the inlet-ports 2 Q and 15 Q, respectively, in the main slide Q for opening to exhaust in advance of the stroke. In such form of valve, Fig. 4, all the operations for the distribution of steam—viz: the opening and the closing of the cylinder to steam and the opening and closing of the cylinder to exhaust—are effected between the operating-faces of the two slides—the main slide and the cut-off slide, respectively—while the principal duty of the fixed valve-seating is that of regulating the communication of the ports of the two valve-slides, respectively, with the cylinder and exhaust-passages as required.

Figure 5:
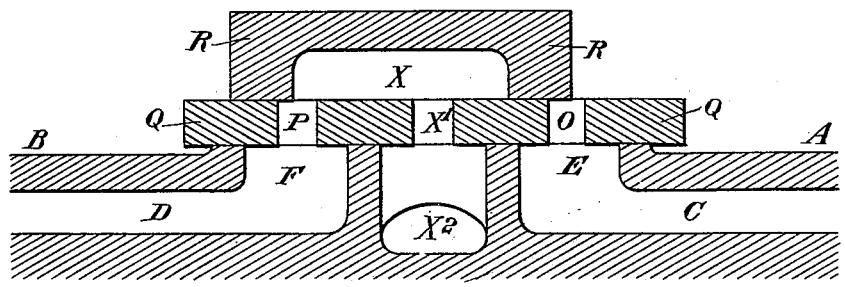

In Fig. 5 the ports O and P in the main slide vibrate opposite to the ports E and F, respectively, in the valve-seating and are always in communication with the cylinder, and the port X' in the main slide is always in communication with the exhaust-passage X" in the valve-seating. In this valve, as in all the examples, the principal features of my invention are realized. Thus during the stroke of the piston from A to B the main slide Q travels from its central position forward and back through half the length of its stroke and starts in the direction from B to A, and the cut-off slide R travels forward through its total stroke in the same direction as that in which the main slide Q started, or from B toward A, and so on with reciprocating and alternate action, so that the main slide Q is always in advance of the cut-off slide R, the cylinder being placed alternately in communication with steam and exhaust for its respective ends.

By so modifying the ports as in Fig. 5 and as hereinbefore provided for the mechanism for operating a main slide may be attached to the slide R, and vice versa, the mechanism for operating a cut-off slide may be attached to the slide Q, and the principal features of my invention will be realized.

The ports may be repeated so as to form grids, so as to give more than opening for each port. The valve-gear (exemplified in the several figures) may be reversed by diametrically reversing the main eccentric with the main slide alone, the cut-off slide R remaining unaffected, or an equivalent effect may be produced by means of any convenient reversing-link or other motion between the main eccentric and its slide. When reversed this valve-gear retains all the properties and advantages described with regard to Figs. 1, 2, 3, 4, 5, and 6.

In order to effect the alteration in the travel of the main slide and the cut-off slide with the objects already described any ordinary link-lever or other motion may be used, and it may be operated either by hand or regulated by any suitable governor mechanism. I may also place two additional cut-off slide-plates on the back of the cut-off slide, one operating on each of two inlet-ports, which may be constructed at each end of the cut-off slide, before described.

Figure 6:
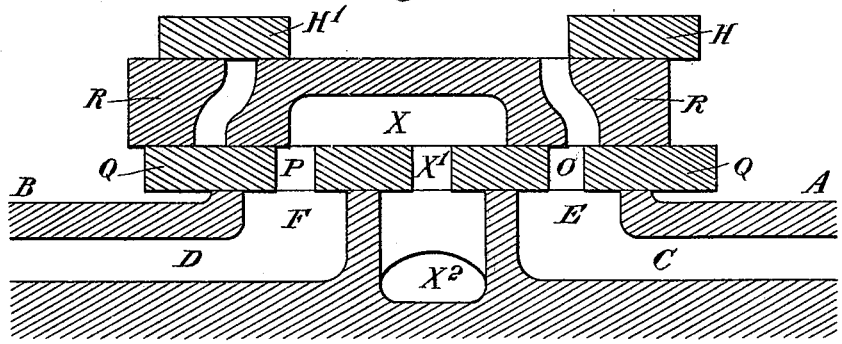

Fig. 6 illustrates an example of the application of auxiliary cut-off slides, as hereinafter mentioned. These are marked H and H', and as the cut-off slide R moves in its stroke in the direction from B toward A it cuts off steam between its face and that of the auxiliary slide H, and in proportion as the slides H and H' are moved to and from the center, or to and from each other, so cut-off of steam is effected earlier or later, respectively, in the stroke of the main piston. These additional cut-off slides may be operated for variable cut off of steam in any ordinary or convenient manner—for instance, by making them gear with right and left hand screws, or by constructing the ports in a diagonal position and by traversing the additional cut-off slides transversely across the back of the cut-off slide. The advantage of introducing these additional cut-off slides is that the cut-off can then be regulated without affecting the reversing or other links.

I do not limit myself to the precise details of arrangement as described. For example, instead of the valve being arranged as one valve for the inlet and exhaust for both ends of the cylinder, it may be arranged as two valves to control separately the inlet and exhaust for each end of the cylinder, or the valvular arrangement may consist of any other number of separate valves to give by their combined action the operations which I have described; and, although I have described but one cut-off slide to perform the functions, in conjunction with the main slide, the functions may be performed by two or more cut-off slides operating in conjunction.

I will now give a few examples, by reference to Figs. 7, 8, 9, and 10, illustrative of the attachment of some valve-operating mechanisms to the valve-slides, such as will produce the required relative movements, as hereinbefore set forth.

In the several views, Figs. 7, 8, 9, and 10, C is the cylinder. P is the piston. R is the valve-seating. H is the cross-head pin. D is the crank-pin. S is the crank-shaft. A is the main eccentric or main slide operating mechanism. B is the cut-off eccentric or cut-off slide operating mechanism. A' is the main slide-rod. B' is the cut-off slide-rod. A" is the "setting" of the eccentric A. B" is the setting of the eccentric B. Other lettering will be described in connection with each figure.

Upon examining one of the principal features of my invention it will be seen that the relative positions and movements of the parts constituting the valve-operating mechanism, and which are there referred to as eccentrics, as embodying the most usual method of obtaining the necessary movements for valve-slides, of the valve-slides themselves, and of the main crank, all determine and regulate the varying positions of the valve-slides relative to the positions of the main piston in its varying movements, and the angular arrangement of the valve-operating mechanism must be so regulated as to determine such required position of valve-slides relative to that of the main piston at all times.

In Fig. 7 the main eccentric A is at right angles to the main crank, but it is also at right angles to its own valve-connecting rod, (the cut-off eccentric B being in its correct relative position to the main eccentric), whereas in Fig. 8 the valve-chest is outside of the center line of the crank-shaft. Consequently the line between the main eccentric A and its valve-slide is at an angle to the line of reciprocation of the main piston, and consequently this main eccentric will require to be approximately at right angles to the line of rod which connects it to its valve-slide, when it will be somewhat modified from the right-angular relation to the crank, but thus it will secure the required and specified positions for the valve-slides relative to the main piston. In Fig. 8 the cut-off slide-rod B' receives its motion from a lever B, pivoted at L, connected to the cross-head H. A'', which is at right angles to A', is the correct setting for the main eccentric A and not A''', which is at right angles to the main crank.

In Fig. 9 there are presumed to be two cylinders side by side, whose piston-rods operate two cranks at right angles. The valve-slides are here illustrated as being operated by two levers pivoted at L L<sup>x</sup> and connected to the two cross-heads, respectively. The two cross-heads are controlled by their respective cranks at right angles, which yields the mechanical equivalent of two eccentrics at right angles. The cylinder-section shown is presumed to be the left cylinder, and the right cylinder is presumed to be on the far side. The lever B operates the cut-off slide-rod B' and is connected to the left cross-head H. The lever A operates the main slide-rod A' and is connected to the right cross-head H<sup>x</sup>. D is the left crank-pin and D<sup>x</sup> is the right crank-pin. The right valve-slides are operated by the reverse levers. Thus the right main slide-rod is operated by the lever B and the right cut-off slide-rod is operated by the lever A.

In Fig. 10 only one eccentric A and B is used. This eccentric A and B operates a carrier at right angles to the direction of reciprocation of the main piston, but by the intervention of a bell-crank rocking shaft the correct movement is given to the main slide-rod A'. The necessary movement for the cut-off slide-rod B' is obtained from the eccentric A and B in the correct direction, as shown. The main slide-rods may be connected with any reversing or other links, and in Fig. 10 a reversing link and lever are shown. In this figure the parts are in the positions which they assume when the piston is at half-stroke.

In all of these constructions it is to be noted that the valve mechanism comprises two independently-operating motions, both actuated from the engine, by which means the several functions of the cut-off valve, already described, are secured.

The valve-operating mechanisms illustrated in Figs. 7, 8, 9, and 10 are a few examples of the independently-operating valve-motion by which I may effect the operation of the valve-slides separately, in the manner hereinbefore described; but I may use any other mechanism which will produce the particular effects in the operation of the valve-slides, as hereinbefore explained.

I have presumed in the foregoing descriptions that motive fluid is admitted from outside the valve and exhausted through the inside; but I do not limit myself to admitting and exhausting the motive fluid in this way, as valves arranged according to my invention can, generally speaking, be adapted to any known or required conditions of working as readily as can other valves.

Having now particularly described and ascertained the nature of the said invention and in what manner the same is to be performed, I declare that what I claim is—

1. In engines operated by steam or other expansible fluid or vapor, the combination with the main slide, of a cut-off slide, and means, substantially as described, whereby two independent motions are secured for separately operating the said valves from the engine, so as to cause the cut off slide to control, first, the inlet ports to regulate the admission of motive fluid to the cylinder, second, the exhaust ports to regulate the cushioning in the cylinder, and third, the inlet ports to cut off the fluid for regulating the expansion, substantially as and for the purpose set forth.

2. In an engine operated by steam or other expansible fluid, the combination with the main slide, of a cut-off slide, and means, substantially as described, whereby two independent motions for separately operating the said valves are secured to cause the cut-off slide to commence its travel in either the same or opposite directions to that of the piston at the moment that the main slide has half or about half completed its travel in the same direction with the cut-off slide, the said means being so arranged as to cause the main valve to travel always in advance of the cut-off slide and to cause the cut-off valve to perform the functions of admission, cut-off and exhaust, substantially as and for the purpose set forth.

In testimony whereof I have signed my name to this specification in the presence of two subscribing witnesses.

C. W. THOMPSON.

Witnesses:
  CHAS. MILLS,
  WILLIAM F. UPTON.